US008335618B2

(12) United States Patent
Knapp et al.

(10) Patent No.: US 8,335,618 B2
(45) Date of Patent: Dec. 18, 2012

(54) AUTOMATIC SHUT DOWN SYSTEM FOR MACHINE HAVING ENGINE AND WORK IMPLEMENT

(75) Inventors: Lucas Adam Knapp, Batavia, IL (US); Mark Alan Welch, Singapore (SG); Arick Matthew Bakken, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 742 days.

(21) Appl. No.: 12/292,753

(22) Filed: Nov. 25, 2008

(65) Prior Publication Data

US 2010/0131150 A1 May 27, 2010

(51) Int. Cl.
*G06F 7/00* (2006.01)

(52) U.S. Cl. ........................................ 701/50; 701/84

(58) Field of Classification Search .................... 701/34, 701/50, 84

See application file for complete search history.

(56) References Cited

U.S. PATENT DOCUMENTS 1,442,311 A 1/1923 Watson
1,442,312 A 1/1923 Watson
1,854,868 A 4/1932 Talkes et al.
2,580,080 A 12/1951 Dewhirst
2,729,806 A 1/1956 Dewhirst
3,241,539 A * 3/1966 Kuehn, III ............ 123/198 DC
4,381,042 A 4/1983 Perry
4,883,034 A 11/1989 Yashiki et al.
5,072,703 A 12/1991 Sutton
5,219,413 A 6/1993 Lineberger
5,222,469 A 6/1993 Sutton
5,619,412 A 4/1997 Hapka
6,363,906 B1 4/2002 Thompson et al.
6,577,909 B1 6/2003 McGowan et al.
6,595,180 B2 7/2003 Thompson et al.
6,675,088 B2 1/2004 Miki
6,768,221 B2 7/2004 Klinger et al.
7,310,576 B1 12/2007 Letang
2003/0173151 A1 * 9/2003 Bodtke et al. .................. 182/18

OTHER PUBLICATIONS

Volvo Operations Manual for L350F, Operating Instructions, (1 page).
Volvo Service Manual for L350F, Automatic Engine Shutdown—Software, Apr. 2007, pp. 9-10, Section 2, printed in Sweden (2 pages).
Volvo 350F Service Manual, Ref. No. VOE 21 A 1003287, Apr. 2007 (4 pages).

* cited by examiner

*Primary Examiner* — John Nguyen
*Assistant Examiner* — Kyung Kim
(74) *Attorney, Agent, or Firm* — Finnegan, Henderson, Farabow, Garrett & Dunner LLP

(57) ABSTRACT

An automatic shut down system for a machine having an engine and a work implement is disclosed. The automatic shut down system may have a position sensor, which may be associated with the work implement. The position sensor may be configured to generate a position signal indicative of a position of the work implement. The automatic shut down system may also have a controller, which may be in communication with the position sensor. The controller may be configured to shut down the engine, based on the position signal.

20 Claims, 3 Drawing Sheets

AUTOMATIC SHUT DOWN SYSTEM FOR MACHINE HAVING ENGINE AND WORK IMPLEMENT

TECHNICAL FIELD

The present disclosure relates generally to a shut down system and, more particularly, to an automatic shut down system for a machine having an engine and a work implement.

BACKGROUND

Machines such as, for example, wheel loaders, compactors, and other types of mobile machines are used to perform a variety of tasks. Before, after, and while performing these tasks, engines of the machines are sometimes allowed to idle. For example, the engines may be allowed to idle to keep the machines warm. Alternatively, the engines may be allowed to idle while operators of the machines take breaks. Unfortunately, the engines may sometimes be allowed to idle unnecessarily for extended periods of time. Unnecessary engine idling, which is prohibited in some states, wastes fuel, wears engine parts, and increases pollution. Therefore, it is desirable to reduce unnecessary engine idling.

One way to reduce unnecessary engine idling is disclosed in U.S. Pat. No. 6,363,906 B1 (the '906 patent) issued to Thompson et al. on Apr. 2, 2002. The '906 patent discloses a method for controlling a compression ignition internal combustion engine of a vehicle to reduce unnecessary idling. The method includes monitoring operating conditions to determine that the vehicle is stationary, monitoring the engine to determine that the engine is idling, and initiating a timer/counter to provide an indication of idling time. The method also includes determining that the engine is operating in an auxiliary power mode. In addition, the method includes determining the engine load. When the idling time exceeds a first threshold and the engine load is less than a second threshold, a warning signal is provided to an operator of the vehicle, and the engine is automatically stopped.

Although the method of the '906 patent may reduce unnecessary idling of the engine of the '906 patent by automatically stopping the engine, the method may do little to prevent certain undesirable shut downs of an engine of a machine having a work implement. For example, it may be undesirable to shut down an engine of a machine having a work implement when the work implement is in a certain position (e.g., above a certain height). Additionally, it may be undesirable to shut down an engine of a machine having a work implement when the work implement is being moved relative to the machine.

The disclosed method and system are directed to overcoming one or more of the problems set forth above and/or other problems in the art.

SUMMARY

In one aspect, the present disclosure is related to an automatic shut down system for a machine including an engine and a work implement. The automatic shut down system may include a position sensor, which may be associated with the work implement. The position sensor may be configured to generate a position signal indicative of a position of the work implement. The automatic shut down system may also include a controller, which may be in communication with the position sensor. The controller may be configured to shut down the engine, based on the position signal.

In another aspect, the present disclosure is related to a method of automatically shutting down an engine of a machine including a work implement. The method may include receiving with a controller a position signal indicative of a position of the work implement. The method may also include shutting down the engine automatically with the controller, based on the position signal.

DETAILED DESCRIPTION

Figure 1:
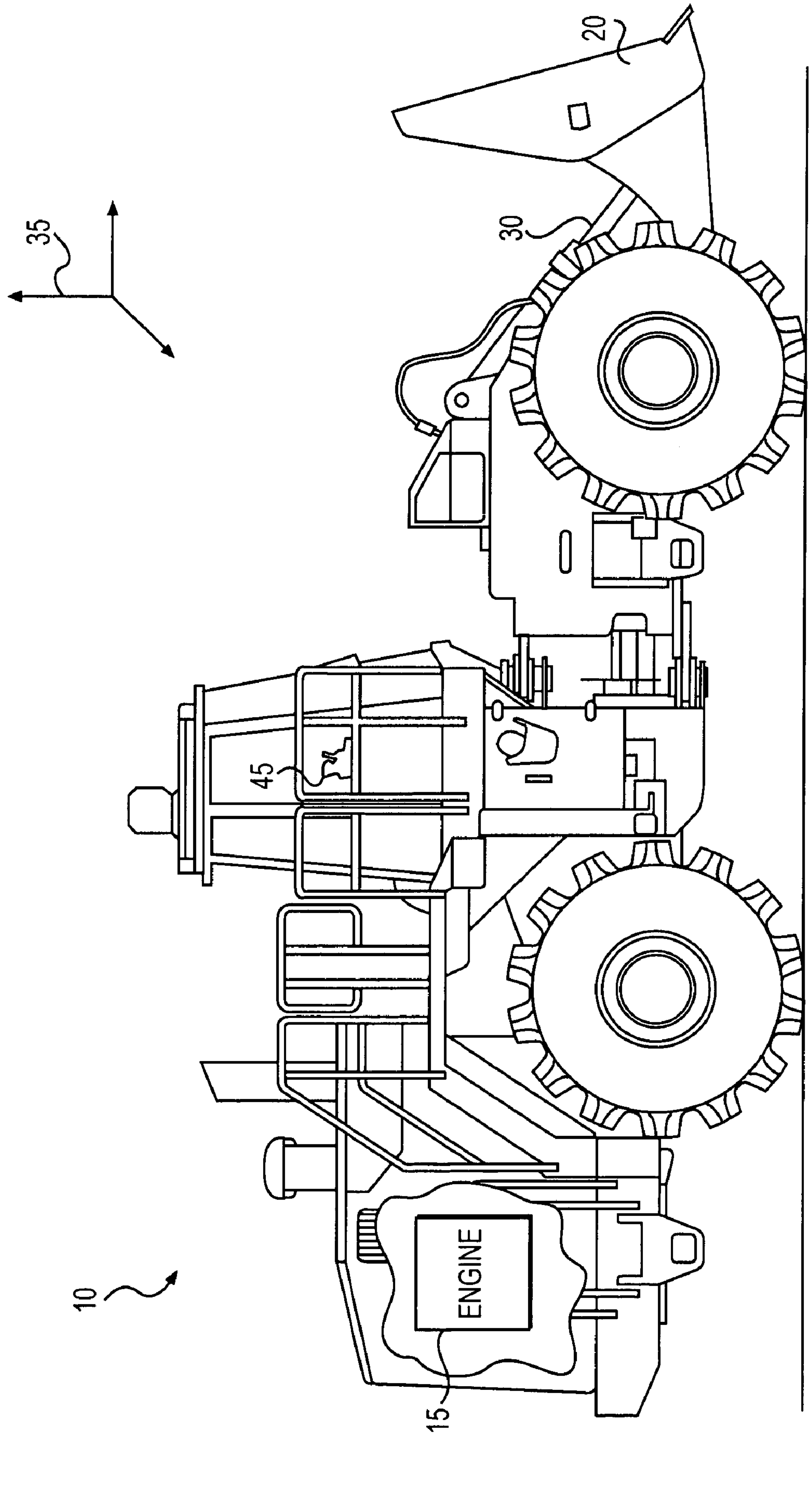
FIG. 1 is an illustration of an exemplary disclosed machine having a work implement.

FIG. 1 illustrates an exemplary machine 10, which may have an engine 15 that is sometimes allowed to idle. Additionally, machine 10 may have a work implement 20, which may be moved relative to machine 10. For example, machine 10 may be a wheel loader, a track loader, a backhoe loader, a compactor, an excavator, or another type of off-highway machine. Alternatively, machine 10 may be a bucket truck, a crane, a fire engine, a ladder truck, or another type of on-highway machine.

Engine 15 may be a combustion engine. For example, engine 15 may be a diesel engine, a gasoline engine, a gaseous fuel-powered engine, or another type of engine known in the art. As previously discussed, engine 15 may sometimes be allowed to idle. For example, engine 15 may be allowed to idle to keep machine 10 warm. Alternatively, engine 15 may be allowed to idle while an operator of machine 10 (hereafter "the operator") takes a break. Unfortunately, engine 15 may sometimes be allowed to idle unnecessarily for an extended period of time. This unnecessary idling, which is prohibited in some states, may waste fuel, wear parts of engine 15 and/or machine 10, and/or increase pollution associated with machine 10. Therefore, in order to reduce unnecessary idling, machine 10 may include an automatic shut down system 25 (referring to FIG. 2), discussed below.

Work implement 20 may include an implement used to perform a task. For example, work implement 20 may be a bucket, a blade, a boom, a nozzle, a ladder, a grapple, a hammer, a fork, a lifting hook, a saw, a shear, or another type of implement used to perform a task. As previously discussed, work implement 20 may be moved relative to machine 10. For example, one or more actuators 30 (hereafter "actuator 30") may move work implement 20 spatially or rotationally relative to machine 10. As illustrated in FIG. 1, this movement may be measured relative to a coordinate system 35, which may be associated with machine 10. For example, a height of work implement 20 may be measured with respect to coordinate system 35.

Actuator 30 may include, for example, a hydraulic cylinder and a piston, and may be controlled by the operator. In particular, the operator may control actuator 30 via a work implement control 45. For example, work implement control 45 may be a joystick, a button, a rocker switch, a hat switch, a touch screen, a microphone, or another device operable by the operator. Work implement control 45 may directly control actuator 30. For example, work implement control 45 may hydraulically or electronically control actuator 30. Alternatively, work implement control 45 may indirectly control actuator 30. For example, work implement control 45 may generate and communicate to a controller 50, illustrated in FIG. 2, an actuation signal indicative of an operation of work implement 20. The actuation signal may be indicative of an operation of work implement that includes no movement of work implement 20 relative to machine 10 (passive operation). Alternatively, the actuation signal may be indicative of an operation of work implement 20 that includes movement of work implement 20 (active operation). For example, if work implement control 45 is in the form of a joystick, the actuation signal may be indicative of a passive operation when the joystick is centered, while the actuation signal may be indicative of an active operation when the joystick is not centered. Controller 50, which may include one or more processors (not shown) and one or more memory devices (not shown), may receive the actuation signal, and may control actuator 30 based on the actuation signal.

Figure 2:
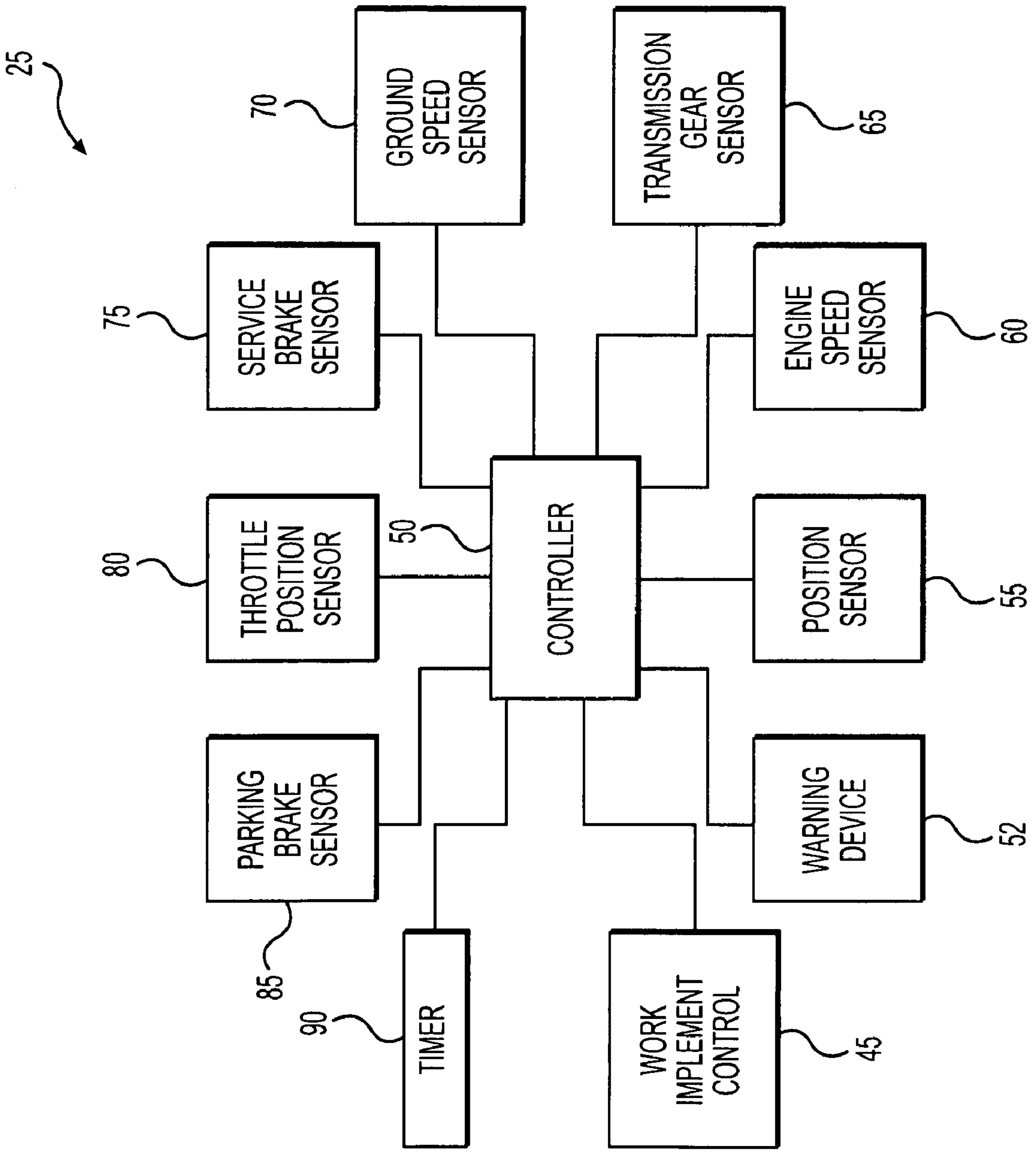
FIG. 2 is a diagrammatic illustration of an exemplary disclosed automatic shut down system for the machine of FIG. 1.

As illustrated in FIG. 2, shut down system 25 may include controller 50. As previously discussed, controller 50 may control actuator 30 based on the actuation signal generated by work implement control 45. Controller 50 may also activate a warning device 52, automatically shut down engine 15, and/or electrically disconnect components of machine 10 from a battery (not shown) of machine 10, based on signals generated by components of shut down system 25. For example, the components of shut down system 25 may include work implement control 45, a work implement position sensor 55, an engine speed sensor 60, a transmission gear sensor 65, a ground speed sensor 70, a service brake sensor 75, a throttle position sensor 80, a parking brake sensor 85, and/or a timer 90. In addition to the components of shut down system 25, the components of machine 10 may also include, for example, a navigation system (not shown), an exterior lighting system (not shown), and/or another system and/or sub-system of machine 10.

Warning device 52 may be configured to warn the operator or another person that controller 50 will shut down engine 15. The warning may be in the form of a sound, a light, a smell, and/or another environmental change detectable by a person. For example, warning device 52 may include a lamp; an alarm; a horn; a head-up display; an odorant or tissue-irritating substance dispenser; or another device operable to warn a person that controller 50 will shut down engine 15. Alternatively or additionally, warning device 52 may be configured to warn machines other than machine 10 that controller 50 will shut down engine 15. For example, warning device 52 may include a transmitter configured to wirelessly transmit information about the status of machine 10 to a worksite control facility (not shown) or another offboard system.

Position sensor 55 may be associated with work implement 20, and may be configured to determine a position of work implement 20. In particular, position sensor 55 may determine the position of work implement 20 by sensing a position of a piston of actuator 30 relative to a hydraulic cylinder of actuator 30. This position of the piston may correspond to the position of work implement 20. Alternatively, position sensor 55 may determine the position of work implement 20 by sensing another parameter associated with actuator 30 such as, for example, a pressure within the hydraulic cylinder of actuator 30. In yet another alternative, position sensor 55 may determine the position of work implement 20 using another method known in the art. In any case, position sensor 55 may generate and communicate to controller 50 a position signal indicative of the position of work implement 20. For example, this position may be measured with respect to coordinate system 35, discussed above.

Engine speed sensor 60 may be associated with engine 15, and may be configured to determine a rotational speed (hereafter a "speed") of engine 15. For example, engine speed sensor 60 may determine the speed of engine 15 by sensing a rotational speed of a crankshaft or a camshaft of engine 15. Alternatively, engine speed sensor 60 may determine the speed of engine 15 using another method known in the art. In any case, engine speed sensor 60 may generate and communicate to controller 50 an engine speed signal indicative of the speed of engine 15.

Transmission gear sensor 65 may be associated with a transmission of machine 10, and may be configured to determine a selected gear of the transmission. For example, the selected gear may be a forward gear, a reverse gear, or a neutral gear. Transmission gear sensor 65 may determine the selected gear by comparing a rotational speed of an input shaft of the transmission to a rotational speed of an output shaft of the transmission. Alternatively, transmission gear sensor 65 may determine the selected gear using another method known in the art. In any case, transmission gear sensor 65 may generate and communicate to controller 50 a gear signal indicative of the selected gear.

Ground speed sensor 70 may be associated with machine 10, and may be configured to determine a ground speed of machine 10. For example, ground speed sensor 70 may determine the ground speed of machine 10 by sensing the rotational speed of the output shaft of the transmission. This rotational speed may be directly related to the ground speed of machine 10. Alternatively, ground speed sensor 70 may determine the ground speed of machine 10 using another method known in the art. In any case, ground speed sensor 70 may generate and communicate to controller 50 a ground speed signal indicative of the ground speed of machine 10.

Service brake sensor 75 may be associated with a service brake of machine 10, and may be configured to determine whether the service brake is applied. For example, service brake sensor 75 may determine whether the service brake is applied by sensing a position of a service brake pedal of machine 10. Alternatively, service brake sensor 75 may determine whether the service brake is applied using another method known in the art. In any case, service brake sensor 75 may generate and communicate to controller 50 a service brake signal indicative of whether the service brake is applied.

Throttle position sensor 80 may be associated with a throttle valve of machine 10, and may be configured to determine a position of the throttle valve. For example, throttle position sensor 80 may include a potentiometer. Alternatively, throttle position sensor 80 may include another type of sensor capable of determining the position of the throttle valve. In any case, throttle position sensor 80 may generate and communicate to controller 50 a throttle position signal indicative of the position of the throttle valve (hereafter the "throttle position"). For example, the throttle position may be measured with respect to terminal positions of the throttle valve. These terminal positions may include a completely closed position and a completely open position. For example, the throttle position may be 0% open when the throttle valve is completely closed and 100% open when the throttle valve is completely open.

Parking brake sensor 85 may be associated with a parking brake of machine 10, and may be configured to determine whether the parking brake is applied. For example, parking brake sensor 85 may determine whether the parking brake is applied by sensing a position of a parking brake switch of machine 10. Alternatively, parking brake sensor 85 may determine whether the parking brake is applied using another method known in the art. In any case, parking brake sensor 85 may generate and communicate to controller 50 a parking brake signal indicative of whether the parking brake is applied.

Timer 90 may be electronic in form, and may be stored in controller 50. Alternatively, timer 90 may be stored in another component of shut down system 25. In yet another alternative, timer 90 may not be electronic in form. In any case, timer 90 may electronically store or otherwise retain an accumulated time. The accumulated time may be adjusted by timer 90 or controller 50. For example, timer 90 may periodically increment the accumulated time. And, controller 50 may set and/or reset the accumulated time to a starting value such as, for example, zero, based on the signals controller 50 receives from the components of shut down system 25.

Based on the accumulated time, controller 50 may determine whether to activate warning device 52, automatically shut down engine 15, and/or electrically disconnect the components of machine 10 from the battery. These determinations may include comparing the accumulated time to predetermined threshold times. For example, the predetermined threshold times may include a threshold start up time, a threshold shut down time, and/or a threshold warning time.

The threshold start up time may include an amount of time during which it may be undesirable to shut down engine 15. For example, engine 15 and/or the other components of machine 10 may require this amount of time to warm up. Therefore, controller 50 may not shut down engine 15 unless engine 15 has been running for longer than the threshold start up time.

The threshold shut down time may also include an amount of time during which it may be undesirable to shut down engine 15. For example, during this amount of time, the operator may allow engine 1 5 to idle while machine 10 is stopped at a traffic light. Alternatively, it may be undesirable to shut down engine 15 for another reason. Therefore, controller 50 may not shut down engine 15 unless controller 50 fails to reset the accumulated time to zero for longer than the threshold shut down time.

The threshold warning time may include an amount of time during which warning device 52 may be activated in anticipation of a shut down of engine 15. This amount of time may be selected such that the operator may prevent controller 50 from shutting down engine 15. For example, the operator may prevent controller 50 from shutting down engine 15 by making it undesirable to shut down engine 15, as discussed below.

Figure 3:
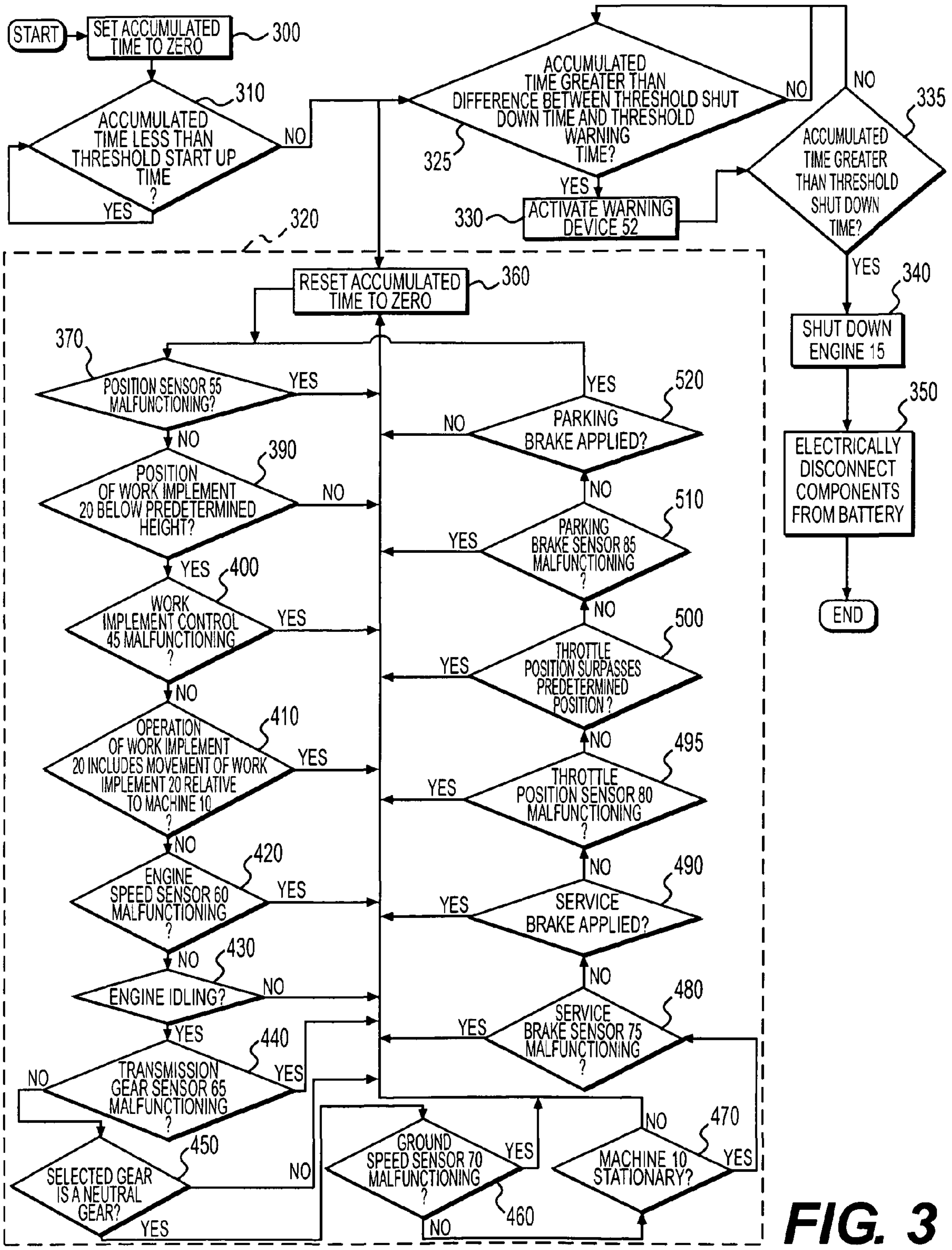
FIG. 3 is a flow chart describing an exemplary method of operating the automatic shut down system of FIG. 2.

FIG. 3 illustrates an exemplary method of operating shut down system 25. FIG. 3 will be discussed in the following section to further illustrate shut down system 25 and its operation.

INDUSTRIAL APPLICABILITY

The disclosed system may be applicable to machines having work implements. The system may automatically (without an operator) shut down an engine of a machine having a work implement. In particular, the system may automatically shut down the engine based on a position of the work implement. Operation of the system will now be described.

As illustrated in FIG. 3, shut down system 25, and more specifically, controller 50 (referring to FIG. 2), may set the accumulated time of timer 90 to zero when engine 15 is turned on (step 300). Controller 50 may then periodically determine whether the accumulated time is less than the threshold start up time (step 310). If the accumulated time is less than the threshold start up time, controller 50 may repeat step 310. Otherwise, controller 50 may repeatedly adjust the accumulated time of timer 90, based on signals controller 50 receives from the components of shut down system 25 (step 320). These adjustments, discussed in further detail below, may include resetting the accumulated time to zero when any of the received signals indicates it is undesirable to shut down engine 15. Concurrently with step 320, controller 50 may, based on the accumulated time, activate warning device 52, shut down engine 15, and/or electrically disconnect the components of machine 10 from the battery of machine 10.

In particular, controller 50 may periodically compare the accumulated time to a difference between the threshold shut down time and the threshold warning time (step 325). If the accumulated time is not greater than the difference between the threshold shut down time and the threshold warning time, controller 50 may repeat step 325. Otherwise, controller 50 may activate warning device 52 in anticipation of a shut down of engine 15 (step 330). Next, controller 50 may compare the accumulated time to the threshold shut down time (step 335). If the accumulated time is not greater than the threshold shut down time, controller 50 may proceed to step 325 and again compare the accumulated time to the difference between the threshold shut down time and the threshold warning time. Otherwise, controller 50 may shut down engine 15 (step 340). For example, controller 50 may shut down engine 15 by cutting a fuel flow to engine 15. It is contemplated that shutting down engine 15 may prevent charging of the battery of machine 10. Therefore, in order to prevent depletion of the battery's charge, controller 50 may, after shutting down engine 15, electrically disconnect the components of machine 10 from the battery (step 350). These disconnections may occur simultaneously or over a period of time. For example, controller 50 may simultaneously disconnect from the battery both the navigation system and the exterior lighting system. Alternatively, controller 50 may disconnect the navigation system from the battery before or after disconnecting the exterior lighting system from the battery.

The adjustments of step 320 may include sub-steps. In particular, step 320 may include the sub-step of resetting the accumulated time to zero (sub-step 360). Although controller 50 may proceed to sub-step 360 directly from step 310, controller 50 may also proceed to sub-step 360 from any of sub-steps 370-520, each of which may include determining whether it is undesirable to shut down engine 15. Specifically, controller 50 may proceed to sub-step 360 from sub-steps 370-520 when controller 50 determines it is undesirable to shut down engine 15. For example, controller 50 may determine it is undesirable to shut down engine 15 based on signals generated by the components of shut down system 25. Although these signals may be received sequentially, as described below, it should be understood that the signals may be received concurrently. Furthermore, though controller 50 may sequentially execute sub-steps 370-520 in the order described below, it should be understood that controller 50 may sequentially execute sub-steps 370-520 in any order. Alternatively, controller 50 may concurrently execute sub-steps 370-520.

Controller 50 may receive from position sensor 55 the position signal indicative of the position of work implement 20. Based on this signal, controller 50 may determine whether position sensor 55 is malfunctioning (sub-step 370), making it undesirable to shut down engine 15. For example, controller 50 may determine that position sensor 55 is malfunctioning when a voltage or a current of the position signal does not correspond to an achievable position of work implement 20. If controller 50 determines that position sensor 55 is malfunctioning, controller 50 may proceed to sub-step 360 and reset the accumulated time to zero. Otherwise, controller 50 may determine whether the position of work implement 20 is below a predetermined height, based on the position signal (sub-step 390). This predetermined height may be measured with respect to coordinate system 35. Alternatively, the predetermined height may be measured with respect to a ground surface upon which machine 10 operates. In yet another alternative, the predetermined height may be measured with respect to another coordinate system. In any case, controller 50 may compare the position of work implement 20 to the predetermined height. If the position of work implement 20 is above or equal to the predetermined height, making it undesirable to shut down engine 15, controller 50 may proceed to sub-step 360 and reset the accumulated time to zero. But, if the position of work implement 20 is below the predetermined height, controller 50 may receive from work implement control 45 the actuation signal indicative of the operation of work implement 20.

Based on the actuation signal, controller 50 may determine whether work implement control 45 is malfunctioning (sub-step 400), making it undesirable to shut down engine 15. For example, controller 50 may determine that work implement control 45 is malfunctioning when a voltage or a current of the actuation signal does not correspond to an operation of work implement 20. If controller 50 determines that work implement control 45 is malfunctioning, controller 50 may proceed to sub-step 360 and reset the accumulated time to zero. Otherwise, controller 50 may determine whether the operation of work implement 20 includes movement of work implement 20 relative to machine 10, based on the actuation signal (sub-step 410). If the operation of work implement 20 includes movement of work implement 20 relative to machine 10, making it undesirable to shut down engine 15, controller 50 may proceed to sub-step 360 and reset the accumulated time to zero. But, if the operation of work implement 20 includes no movement of work implement 20 relative to machine 10, controller 50 may receive from engine speed sensor 60 the engine speed signal indicative of the speed of engine 15.

Based on the engine speed signal, controller 50 may determine whether engine speed sensor 60 is malfunctioning (sub-step 420), making it undesirable to shut down engine 15. For example, controller 50 may determine that engine speed sensor 60 is malfunctioning when a voltage or a current of the engine speed signal does not correspond to an achievable speed of engine 15. If controller 50 determines that engine speed sensor 60 is malfunctioning, controller 50 may proceed to sub-step 360 and reset the accumulated time to zero. Otherwise, controller 50 may determine whether engine 15 is idling, based on the engine speed signal (sub-step 430). For example, engine 15 may be idling when the speed of engine 15 is below a threshold speed. If engine 15 is not idling, making it undesirable to shut down engine 15, controller 50 may proceed to sub-step 360 and reset the accumulated time to zero. But, if engine 15 is idling, controller 50 may receive from transmission gear sensor 65 the gear signal indicative of the selected gear.

Based on the gear signal, controller 50 may determine whether transmission gear sensor 65 is malfunctioning (sub-step 440), making it undesirable to shut down engine 15. For example, controller 50 may determine that transmission gear sensor 65 is malfunctioning when a voltage or a current of the gear signal does not correspond to a gear of the transmission. If controller 50 determines that transmission gear sensor 65 is malfunctioning, controller 50 may proceed to sub-step 360 and reset the accumulated time to zero. Otherwise, controller 50 may determine whether the selected gear is a neutral gear, based on the gear signal (sub-step 450). If the selected gear is not a neutral gear, making it undesirable to shut down engine 15, controller 50 may proceed to sub-step 360 and reset the accumulated time to zero. But, if the selected gear is a neutral gear, controller 50 may receive from ground speed sensor 70 the ground speed signal indicative of the ground speed of machine 10.

Based on the ground speed signal, controller 50 may determine whether ground speed sensor 70 is malfunctioning (sub-step 460), making it undesirable to shut down engine 15. For example, controller 50 may determine that ground speed sensor 70 is malfunctioning when a voltage or a current of the ground speed signal does not correspond to a ground speed achievable by machine 10. If controller 50 determines that ground speed sensor 70 is malfunctioning, controller 50 may proceed to sub-step 360 and reset the accumulated time to zero. Otherwise, controller 50 may determine whether machine 10 is stationary, based on the ground speed signal (sub-step 470). For example, machine 10 may be stationary when the ground speed of machine 10 is approximately zero. If machine 10 is not stationary, making it undesirable to shut down engine 15, controller 50 may proceed to sub-step 360 and reset the accumulated time to zero. But, if machine 10 is stationary, controller 50 may receive from service brake sensor 75 the service brake signal indicative of whether the service brake is applied.

Based on the service brake signal, controller 50 may determine whether service brake sensor 75 is malfunctioning (sub-step 480), making it undesirable to shut down engine 15. For example, controller 50 may determine that service brake sensor 75 is malfunctioning when a voltage or a current of the service brake signal does not indicate whether the service brake is applied. If controller 50 determines that service brake sensor 75 is malfunctioning, controller 50 may proceed to sub-step 360 and reset the accumulated time to zero. Otherwise, controller 50 may determine whether the service brake is applied, based on the service brake signal (sub-step 490). If the service brake is applied, making it undesirable to shut down engine 15, controller 50 may proceed to sub-step 360 and reset the accumulated time to zero. But, if the service brake is not applied, controller 50 may receive from throttle position sensor 80 the throttle position signal indicative of the throttle position.

Based on the throttle position signal, controller 50 may determine whether throttle position sensor 80 is malfunctioning (sub-step 495), making it undesirable to shut down engine 15. For example, controller 50 may determine that throttle position sensor 80 is malfunctioning when a voltage or a current of the throttle position signal does not correspond to an achievable throttle position. If controller 50 determines that throttle position sensor 80 is malfunctioning, controller 50 may proceed to sub-step 360 and reset the accumulated time to zero. Otherwise, controller 50 may determine whether the throttle position surpasses a predetermined position, based on the throttle position signal (sub-step 500). For example, if the throttle position is measured as a percentage open, the predetermined position may be a predetermined percentage open. And, controller 50 may determine that the throttle position surpasses the predetermined position when the throttle position is more open than the predetermined percentage open. If the throttle position surpasses the predetermined position, making it undesirable to shut down engine 15, controller 50 may proceed to sub-step 360 and reset the accumulated time to zero. But, if the throttle position fails to surpass the predetermined position, controller 50 may receive from parking brake sensor 85 the parking brake signal indicative of whether the parking brake is applied.

Based on the parking brake signal, controller 50 may determine whether parking brake sensor 85 is malfunctioning (sub-step 510), making it undesirable to shut down engine 15. For example, controller 50 may determine that parking brake sensor 85 is malfunctioning when a voltage or a current of the parking brake signal does not indicate whether the parking brake is applied. If controller 50 determines that parking brake sensor 85 is malfunctioning, controller 50 may proceed to sub-step 360 and reset the accumulated time to zero. Otherwise, controller 50 may determine whether the parking brake is applied, based on the parking brake signal (sub-step 520). If the parking brake is not applied, making it undesirable to shut down engine 15, controller 50 may proceed to sub-step 360 and reset the accumulated time to zero. But, if the parking brake is applied, controller 50 may again receive signals from the components of shut down system 25, and may repeat sub-steps 370-520.

While controller 50 repeats sub-steps 370-520, timer 90 may periodically increment the accumulated time, potentially causing controller 50 to activate warning device 52 at step 330, shut down engine 15 at step 340, and/or electrically disconnect the components of machine 10 from the battery of machine 10 at step 350.

In particular, controller 50 may activate warning device 52 at step 330 when, at step 325, the accumulated time is greater than the difference between the threshold shut down time and the threshold warning time. This may occur when, for longer than the difference between the threshold shut down time and the threshold warning time, none of the signals controller 50 receives indicates it is undesirable to shut down engine 15. This is because controller 50 may only reset the accumulated time to zero at sub-step 360 when it is undesirable to shut down engine 15. Therefore, controller 50 may only activate warning device 52 when it may be desirable to shut down engine 15. It should be noted, however, that warning device 52 may be activated before it is desirable to shut down engine 15. This is because it may only be desirable to shut down engine 15 at step 340 when, at step 335, the accumulated time is greater than the threshold shut down time. Therefore, after warning device 52 is activated, the operator may prevent controller 50 from shutting down engine 15.

It is contemplated that the operator may prevent controller 50 from shutting down engine 15 by making it undesirable to shut down engine 15. Specifically, the operator may cause controller 50 to reset the accumulated time to zero, preventing controller 50 from activating warning device 52 at step 330, and preventing controller 50 from shutting down engine 15 at step 340. For example, the operator may make it undesirable to shut down engine 15 by controlling actuator 30 to move work implement 20 relative to machine 10. As another example, the operator may make it undesirable to shut down engine 15 by applying a service brake of machine 10. As yet another example, the operator may make it undesirable to shut down engine 15 by selecting a forward or a reverse gear of the transmission of machine 10.

Although the operator may sometimes prevent controller 50 from shutting down engine 15, it is contemplated that shut down system 25 may still reduce unnecessary idling of engine 15 when it is desirable to do so. For example, shut down system 25 may reduce unnecessary idling of engine 15 when the operator takes a break. Specifically, controller 50 may shut down engine 15 at step 340 when, at step 335, the accumulated time is greater than the threshold shut down time. By automatically shutting down engine 15, shut down system 25 may prevent engine 15 from unnecessarily wasting fuel, wearing parts of engine 15 and/or machine 10, and/or increasing pollution associated with machine 10. Moreover, by automatically shutting down engine 15, shut down system 25 may reduce a likelihood of noncompliance with laws and/or regulations prohibiting the unnecessary idling of engines for extended periods of time.

It will be apparent to those skilled in the art that various modifications and variations can be made to the method and system of the present disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. An automatic shut down system for a machine having an engine and a work implement, the automatic shut down system comprising:

a position sensor associated with the work implement and configured to generate a position signal indicative of a position of the work implement; and a controller in communication with the position sensor, the controller being configured to:

determine whether the position of the work implement is below a predetermined height, based on the position signal; and shut down the engine when the position of the work implement is below the predetermined height, based on the position signal.

2. The automatic shut down system of claim 1, wherein:

the controller is further configured to determine whether the position sensor is malfunctioning, based on the position signal; and the controller is configured to shut down the engine when the position sensor is not malfunctioning.

3. The automatic shut down system of claim 1, further including a work implement control, the work implement control being configured to generate an actuation signal indicative of an operation of the work implement, wherein:

the controller is in communication with the work implement control;

the controller is further configured to determine whether the operation of the work implement includes movement of the work implement relative to the machine, based on the actuation signal; and the controller is configured to shut down the engine when the operation of the work implement includes no movement of the work implement relative to the machine.

4. The automatic shut down system of claim 1, further including a warning device, wherein:

the controller is in communication with the warning device; and the controller is further configured to activate the warning device before shutting down the engine.

5. The automatic shut down system of claim 1, further including a timer, wherein:

the controller is in communication with the timer; and the controller is configured to shut down the engine when an accumulated time of the timer is greater than a threshold shut down time.

6. The automatic shut down system of claim 1, wherein the predetermined height is less than a maximum height of the work implement.

7. The automatic shut down system of claim 1, wherein the controller is configured to measure the position of the work implement with respect to a ground surface.

8. A method of automatically shutting down an engine of a machine having a work implement, the method comprising:

receiving with a controller a position signal indicative of a position of the work implement;

shutting down the engine automatically with the controller, based on the position signal; and determining with the controller whether the position of the work implement is below a predetermined height, based on the position signal, wherein the shutting down the engine occurs in response to the position of the work implement being below the predetermined height.

9. The method of claim 8, further including determining with the controller whether a position sensor is malfunctioning, based on the position signal, wherein the shutting down of the engine occurs when the position sensor is not malfunctioning.

10. The method of claim 8, further including:

receiving with the controller an actuation signal indicative of an operation of the work implement; and determining with the controller whether the operation of the work implement includes movement of the work implement relative to the machine, based on the actuation signal, wherein the shutting down of the engine occurs when the operation of the work implement includes no movement of the work implement relative to the machine.

11. The method of claim 10, further including:

receiving with the controller an engine speed signal indicative of a rotational speed of the engine; and determining with the controller whether the engine is idling, based on the engine speed signal, wherein the shutting down of the engine occurs when the engine is idling.

12. The method of claim 11, further including:

receiving with the controller a gear signal indicative of a selected gear of a transmission of the machine; and determining with the controller whether the selected gear is a neutral gear, based on the gear signal, wherein the shutting down of the engine occurs when the selected gear is a neutral gear.

13. The method of claim 12, further including:

receiving with the controller a ground speed signal indicative of a ground speed of the machine; and determining with the controller whether the machine is stationary, based on the ground speed signal, wherein the shutting down of the engine occurs when the machine is stationary.

14. The method of claim 13, further including:

receiving with the controller a service brake signal indicative of whether a service brake of the machine is applied; and determining with the controller whether the service brake is applied, based on the service brake signal, wherein the shutting down of the engine occurs when the service brake is not applied.

15. The method of claim 14, further including:

receiving with the controller a throttle position signal indicative of a position of a throttle valve of the engine; and determining with the controller whether the position of the throttle valve surpasses a predetermined position, based on the throttle position signal, wherein the shutting down of the engine occurs when the position of the throttle valve fails to surpass the predetermined position.

16. The method of claim 15, further including:

receiving with the controller a parking brake signal indicative of whether a parking brake of the machine is applied; and determining with the controller whether the parking brake is applied, based on the parking brake signal, wherein the shutting down of the engine occurs when the parking brake is applied.

17. The method of claim 8, further including, before the shutting down of the engine, activating a warning device.

18. The method of claim 8, further including, after the shutting down of the engine, electrically disconnecting components of the machine from a battery of the machine.

19. A machine, comprising:

an engine;

a work implement; and an automatic shut down system, including:

a position sensor associated with the work implement and configured to generate a position signal indicative of a position of the work implement; and a controller in communication with the position sensor, the controller being configured to:

determine whether the position of the work implement is below a predetermined height, based on the position signal; and shut down the engine in response to the position of the work implement being below the predetermined height.

20. The machine of claim 19, wherein:

the controller is further configured to determine whether the position sensor is malfunctioning, based on the position signal; and the controller is configured to shut down the engine when the position sensor is not malfunctioning.

* * * * *

UNITED STATES PATENT AND TRADEMARK OFFICE

CERTIFICATE OF CORRECTION

PATENT NO. : 8,335,618 B2
APPLICATION NO. : 12/292753
DATED : December 18, 2012
INVENTOR(S) : Knapp et al.

It is certified that error appears in the above-identified patent and that said Letters Patent is hereby corrected as shown below:

Title Page, Column 2, (Other Publications), lines 1-2, delete "Instructions, (1 page)." and insert -- Instructions, received Aug. 26, 2008 (1 page). --.

In the Specification

Column 5, line 34, delete "engine 1 5" and insert -- engine 15 --.

Signed and Sealed this
Eleventh Day of August, 2015

Michelle K. Lee
*Director of the United States Patent and Trademark Office*